US010615693B2

(12) United States Patent
Mehdi et al.

(10) Patent No.: US 10,615,693 B2
(45) Date of Patent: Apr. 7, 2020

(54) DC-TO-DC VOLTAGE CONVERTERS WITH CONTROLLERS TO SWITCH ON A LOW-SIDE FET FOR A TIME INTERVAL BEFORE SWITCHING ON A HIGH-SIDE FET (71) Applicant: TEXAS INSTRUMENTS INCORPORATED, Dallas, TX (US)

(72) Inventors: Syed Wasif Mehdi, Freising (DE); Stefan Herzer, Marzling (DE); Antonio Priego, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/024,371

(22) Filed: Jun. 29, 2018

(65) Prior Publication Data
US 2020/0007035 A1 Jan. 2, 2020

(51) Int. Cl.
*H02M 3/158* (2006.01)
*H02M 3/156* (2006.01)

(52) U.S. Cl.
CPC .......... *H02M 3/158* (2013.01); *H02M 3/156* (2013.01); *Y02B 70/1466* (2013.01)

(58) Field of Classification Search
CPC ....... H02M 3/156–1584; H02M 3/1588; H02J 1/102; Y02B 70/1466
USPC .............. 323/224, 271, 282, 283, 288, 305; 363/21.02, 21.03
See application file for complete search history.

(56) References Cited

U.S. PATENT DOCUMENTS

| 5,414,341 | A | 5/1995 | Brown |
| 6,246,220 | B1* | 6/2001 | Isham ................. H02M 3/1588 323/224 |
| 9,035,635 | B2* | 5/2015 | Rosu-Hamzescu ......................... H03K 17/0822 323/282 |
| 2002/0175661 | A1* | 11/2002 | Wheeler ............... H02M 1/088 323/282 |

(Continued)

FOREIGN PATENT DOCUMENTS

| EP | 2704301 B1 | 7/2016 |
| JP | 2010200554 A | 9/2010 |

(Continued)

OTHER PUBLICATIONS

Search Report for PCT Application No. PCT/US19/39814, dated Sep. 26, 2019, 1 page.

(Continued)

*Primary Examiner* — Yemane Mehari
(74) *Attorney, Agent, or Firm* — Tuenlap Chan; Charles A. Brill; Frank D. Cimino (57) ABSTRACT

A system comprises a DC-to-DC voltage converter, the DC-to-DC voltage converter comprising: a high-side FET comprising a gate, a source, and a drain; a node coupled to the source of the high-side FET; a low-side FET comprising a gate, a source, and a drain coupled to the node; and a controller coupled to the gate of the high-side FET to switch on and off the high-side FET, and coupled to the gate of the low-side FET to switch on and off the low-side FET, the controller configured to switch on the low-side FET for a time interval before switching on the high-side FET and to switch off the low-side FET before switching on the high-side FET.

16 Claims, 8 Drawing Sheets (56) References Cited

U.S. PATENT DOCUMENTS

| | | | |
|---|---|---|---|
| 2010/0213910 A1* | 8/2010 | Chen | H02M 3/1588 |
| | | | 323/282 |
| 2011/0210708 A1* | 9/2011 | Herbsommer | H01L 23/49524 |
| | | | 323/271 |
| 2014/0266091 A1* | 9/2014 | Zuniga | H02M 3/156 |
| | | | 323/271 |
| 2014/0266113 A1* | 9/2014 | Zuniga | H02M 1/088 |
| | | | 323/282 |
| 2014/0266130 A1* | 9/2014 | Chiang | H02M 3/156 |
| | | | 323/311 |
| 2015/0123630 A1* | 5/2015 | Ribarich | G01R 31/40 |
| | | | 323/271 |
| 2015/0131337 A1* | 5/2015 | Gabrielsson | H02M 1/4241 |
| | | | 363/21.03 |
| 2017/0250605 A1* | 8/2017 | Park | G09G 3/3233 |

FOREIGN PATENT DOCUMENTS

| | | |
|---|---|---|
| JP | 5428713 B2 | 2/2014 |
| WO | 2002063770 A2 | 8/2002 |

OTHER PUBLICATIONS

JP5428713B2, Machine Translation, 22 pages.
JP2010200554A, Machine Translation, 10 pages.

* cited by examiner

DC-TO-DC VOLTAGE CONVERTERS WITH CONTROLLERS TO SWITCH ON A LOW-SIDE FET FOR A TIME INTERVAL BEFORE SWITCHING ON A HIGH-SIDE FET

BACKGROUND

A step-down DC-to-DC voltage converter regulates a load voltage, where the load voltage is less in value than an input voltage provided by a power source. A buck converter topology denotes a class of DC-to-DC voltage converters with switching devices to control current through an inductor (and usually also a capacitor) to regulate the load voltage. A buck converter includes a high-side switching device to couple the inductor to the power source, and a low-side switching device to provide a current path from ground to the inductor when the high-side switching device is switched off. In some buck converters, the high-side switching device is a Field-Effect Transistor (FET), referred to as a high-side FET, and the low-side device is an FET, referred to as a low-side FET, or a diode, sometimes referred to as a flyback diode.

SUMMARY

In accordance with at least one example of the disclosure, a system comprises a DC-to-DC voltage converter, the DC-to-DC voltage converter comprising: a high-side FET comprising a gate, a source, and a drain; a node coupled to the source of the high-side FET; a low-side FET comprising a gate, a source, and a drain coupled to the node; and a controller coupled to the gate of the high-side FET to switch on and off the high-side FET, and coupled to the gate of the low-side FET to switch on and off the low-side FET, the controller configured to switch on the low-side FET for a time interval before switching on the high-side FET and to switch off the low-side FET before switching on the high-side FET.

In accordance with at least one example of the disclosure, a system comprises: an inductor; a first FET to conduct current to the inductor when switched on; a diode coupled to the inductor to conduct current to the inductor when the first FET is switched off; a second FET coupled in parallel with the diode; and a controller to switch on the second FET for a time interval before switching on the first FET and to switch off the second FET before switching on the first FET.

In accordance with at least one example of the disclosure, a method to operate a DC-to-DC voltage converter comprises: switching on and off a high-side FET and a low-side FET in the DC-to-DC voltage converter to regulate a voltage at a node in the DC-to-DC voltage converter; during asynchronous operation of the DC-to-DC voltage converter, switching on the low-side FET for a time interval before switching on the high-side FET; and during asynchronous operation of the DC-to-DC voltage converter, switching off the low-side FET before switching on the high-side FET.

BRIEF DESCRIPTION OF THE DRAWINGS

For a detailed description of various examples, reference will now be made to the accompanying drawings in which.

DETAILED DESCRIPTION

In many conventional DC-to-DC voltage converters having a buck converter topology with a high-side device and a low-side device, during asynchronous mode operation when the low-side device is forward diode-conducting, the conduction current of majority carriers in the low-side device causes charging of its space region. When the high-side device is switched on to provide current to a load, some of the current in the high-side device is used to discharge the space region, resulting in unwanted power consumption. Furthermore, because of parasitic inductance, the current used to discharge the space region can result in unwanted noise spikes, which may interfere with other circuits coupled to the conventional DC-to-DC voltage converter.

Embodiments include a DC-to-DC voltage converter with a controller so that during asynchronous operation, the controller turns on a low-side FET for a time interval before turning on a high-side FET so as to discharge the space region.

Figure 1:
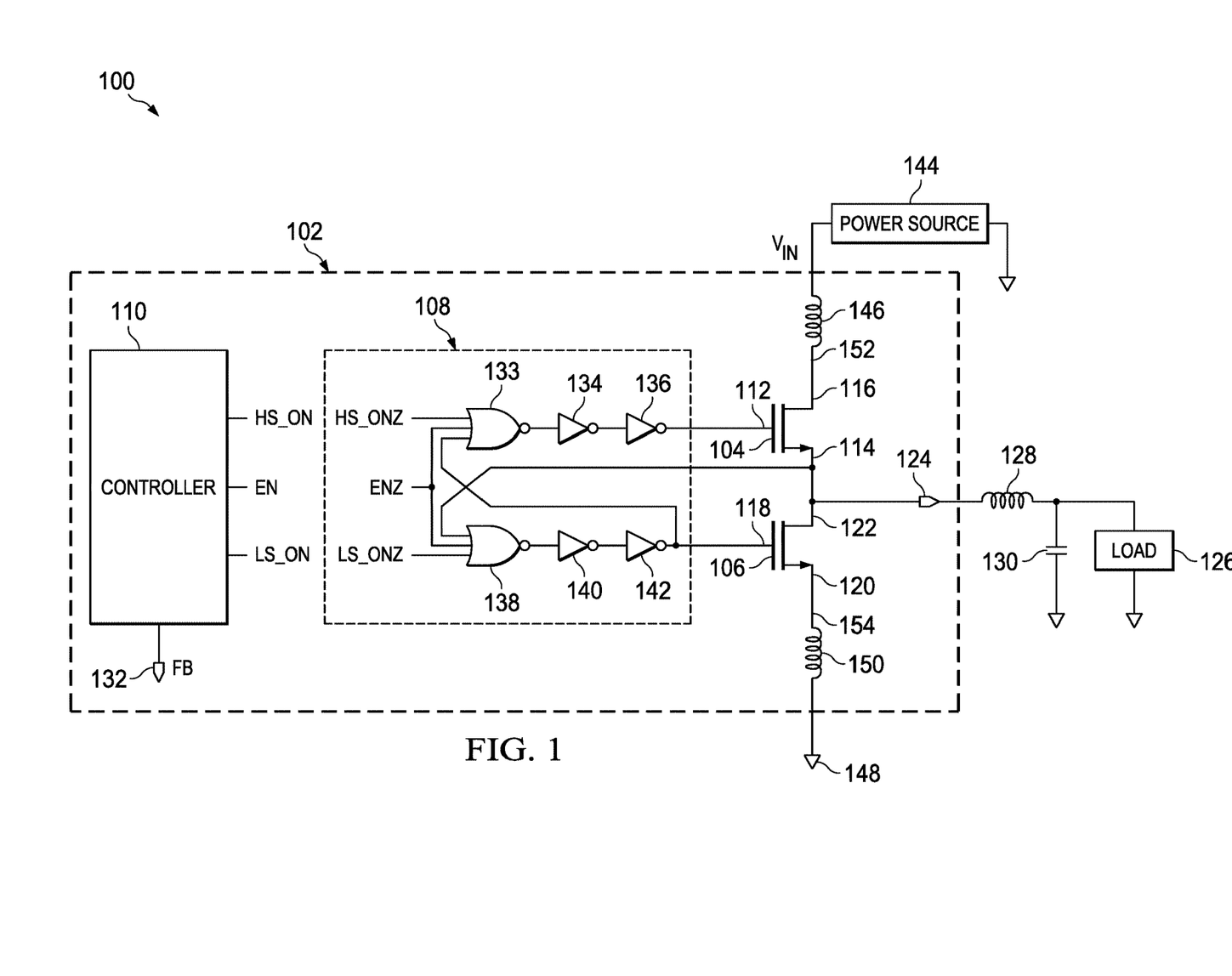
FIG. 1 shows a system comprising a DC-to-DC voltage converter in accordance with various examples.

FIG. 1 depicts an illustrative system 100 comprising a DC-to-DC voltage converter 102. In some embodiments, the DC-to-DC voltage converter 102 is a buck-converter. The DC-to-DC voltage converter 102 comprises a high-side FET 104, a low-side FET 106, a gate driver 108, and a controller 110. (The gate driver 108 may also include a charge pump for some embodiments.) The controller 110 is coupled to the high-side FET 104 and the low-side FET 106 by way of the gate driver 108. Embodiments can include other modules (not shown) in addition to the controller 110 and the gate driver 108.

The high-side FET 104 comprises a gate 112, a source 114, and a drain 116. A node 124 is coupled to the source 114 of the high-side FET 104. The node 124 is referred to as a switching node, and it can be a pin. The low-side FET 106 comprises a gate 118, a source 120, and a drain 122 coupled to the node 124.

By way of the gate driver 108, the controller 110 is coupled to the gate 112 of the high-side FET 104 to switch on and off the high-side FET 104 and is coupled to the gate 118 of the low-side FET 106 to switch on and off the low-side FET 106 so as to provide a load voltage to a load 126. The load 126 is coupled to the node 124 by way of an inductor 128 and a capacitor 130.

The drain 116 of the high-side FET 104 is coupled to a power source 144, where FIG. 1 illustrates the power source 144 providing a voltage $V_{IN}$ as an input voltage to the DC-to-DC voltage converter 102. A parasitic inductor 146 represents parasitic inductance associated with the coupling of the drain 116 to the power source 144. This coupling can include an input-output (I/O) pin (not shown). The source 120 of the low-side FET 106 is coupled to a ground 148. A parasitic inductor 150 represents parasitic inductance associated with the coupling of the source 120 to the ground 148. This coupling can include an I/O pin (not shown).

In the particular embodiment illustrated in FIG. 1, the controller 110 provides to the gate driver 108 the logic signals HS_ON, EN, and LS_ON to switch on and off the high-side FET 104 and the low-side FET 106. The logical complements of these signals, denoted in FIG. 1 respectively as HS_ONZ, ENZ, and LS_ONZ, are indicated as signals in the gate driver 108.

The gate driver 108 comprises a NOR gate 133 coupled to serially-connected buffers 134 and 136, where the buffer 136 directly drives the gate 112 of the high-side FET 104. In practice, more than two buffers may be serially connected between the output of the NOR gate 133 and the gate 112 of the high-side FET 104, but for ease of illustration only two such buffers, the buffers 134 and 136, are explicitly shown.

The gate driver 108 comprises a NOR gate 138 coupled to serially-connected buffers 140 and 142, where the buffer 142 directly drives the gate 118 of the low-side FET 106. In practice, more than two buffers may be serially connected between the output of the NOR gate 138 and the gate 118 of the low-side FET 106, but for ease of illustration only two such buffers, the buffers 140 and 142, are explicitly shown.

The signals HS_ONZ and ENZ are provided as two inputs to the NOR gate 133, and the output of the buffer 142 is provided as a third input to the NOR gate 133. The signals LS_ONZ and ENZ are provided as two inputs to the NOR gate 138, and the source 114 of the high-side FET 104 is connected to a third input of the NOR gate 138.

To enable the gate driver 108, the controller 110 asserts the signal EN to HIGH (the signal ENZ is de-asserted to LOW). With the gate driver 108 enabled, the controller 110 can operate the DC-to-DC voltage converter 102 in a synchronous mode or in an asynchronous (or non-synchronous) mode, depending upon the signals HS_ON and LS_ON.

When the controller 110 operates the DC-to-DC voltage converter 102 in synchronous mode, the signals HS_ON and LS_ON are alternatively cycled between HIGH and LOW without overlap, and such that the high-side FET 104 and the low-side FET 106 are not both simultaneously on. A feedback circuit (not shown) provides a feedback signal to a feedback node 132 so that the controller 110 can control the duty cycles of the signals HS_ON and LS_ON to provide a regulated load voltage to the load 126.

When the controller 110 operates the DC-to-DC voltage converter 102 in an asynchronous mode, the signal LS_ON is de-asserted to LOW (LS_ONZ is asserted to HIGH) so that the gate 118 of the low-side FET 106 is held LOW. The feedback circuit (not shown) provides a feedback signal to the feedback node 132 so that the controller 110 can control the duty cycle of the signal HS_ON so that a regulated load voltage is provided to the load 126. The low-side FET 106 operates as a flyback diode to conduct current to the inductor 128 when the low-side FET 106 is forward conducting. When the controller 110 de-asserts the signal HS_ON to LOW (the signal HS_ONZ is asserted HIGH) to switch off the high-side FET 104, the low-side FET 106 becomes forward conducting when the voltage at the node 124 falls to a forward voltage drop below ground voltage, about −0.7V. When the controller 110 asserts the signal HS_ON to HIGH (the signal HS_ONZ is LOW), the high-side FET 104 is switched on to provide current to the inductor 128 by way of the node 124, and as the voltage at the node 124 rises, the low-side FET 106 becomes reversed biased.

During asynchronous mode operation when the low-side FET 106 is forward conducting, the conduction current of majority carriers in the low-side FET 106 causes charging of its space region. If the charge stored in the space region is not removed, then when the controller 110 switches on the high-side FET 104, some of the current provided by the high-side FET 104 would be used to discharge the space region. The current used to discharge the space region, referred to as a recovery space charge current, flows across a voltage drop of $V_{IN}$, resulting in unwanted power consumption. Furthermore, because of the parasitic inductance represented by the parasitic inductors 146 and 150, the recovery space charge current results in noise spikes at nodes 152 and 154. These noise spikes may interfere with other circuits (not shown) coupled to the DC-to-DC voltage converter 102.

During asynchronous operation, in the embodiment of FIG. 1, the controller 110 is configured to switch on the low-side FET 106 for a time interval before switching on the high-side FET 104 and to switch off the low-side FET 106 before switching on the high-side FET 104. The controller 110 is configured to switch on the low-side FET 106 for the time interval to discharge a space region in the low-side FET 106 developed during forward conduction of the low-side FET 106 when the DC-to-DC voltage converter 102 is in asynchronous operation. The value of the time interval can be chosen so that the space region is discharged, and this value can be a function of the size of the low-side FET 106 (and/or the size of a flyback diode if used).

Figure 2:
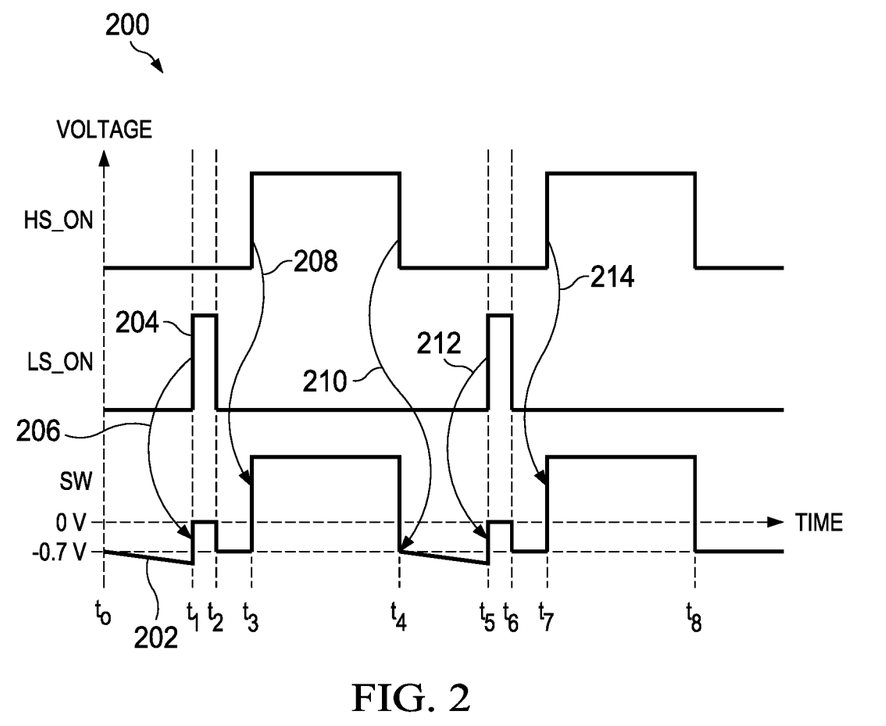
FIG. 2 shows a timing diagram in accordance with various examples.

FIG. 2 depicts an illustrative timing diagram 200 when an embodiment, such as the DC-to-DC voltage converter 102, is in an asynchronous mode, showing voltage as a function of time for the logic signals LS_ON and LS_ON, and a signal SW representing the voltage at the node 124. The timing diagram 200 does not represent realistic depictions of the signals LS_ON, LS_ON, and SW, but it serves to represent descriptive characteristics of an embodiment, such as the illustrative system 100.

Two cycles are shown in FIG. 2 starting at a time t0 where the signals HS_ON and LS_ON are both LOW and the low-side FET 106 starts to forward conduct when the signal SW drops to about −0.7V. A portion of the signal SW labeled 202 indicates charging of the space region of the low-side FET 106 while forward conducting.

At a time t1 when the signal HS_ON is LOW and before the controller 110 asserts HIGH the signal HS_ON, the controller 110 asserts HIGH the signal LS_ON to switch ON the low-side FET 106, indicated by a portion of the signal LS_ON labeled 204. While switched on, the low-side FET 106 discharges the space region, indicated by an event labeled 206, bringing the signal SW to 0V. The controller 110 switches off the low-side FET 106 at a time t2 by de-asserting the signal LS_ON to LOW. At a time t3, the controller 110 asserts HIGH the signal HS_ON, causing the signal SW to rise in voltage indicated by an event labeled 208. Accordingly, the controller 110 is configured during asynchronous operation of the DC-to-DC voltage converter 102 to switch on the low-side FET 106 for a time interval (represented by the time difference t2−t1) before switching on the high-side FET 104 and to switch off the low-side FET 106 before switching on the high-side FET 104.

At a time t4, the controller 110 de-asserts the signal HS_ON to LOW so as to switch off the high-side FET 104, indicated by an event labeled 210, resulting in the low-side FET 106 forward conducting and charging of the space region. The cycle repeats, with an event labeled 212 denoting the assertion of the signal LS_ON to HIGH at a time t5 to switch on the low-side FET 106 for a time interval lasting until a time t6. This event causes discharging of the space region, and at a time t7 the controller 110 asserts the signal HS_ON to HIGH to again switch on the high-side FET 104, indicated by an event labeled 214.

Figure 3:
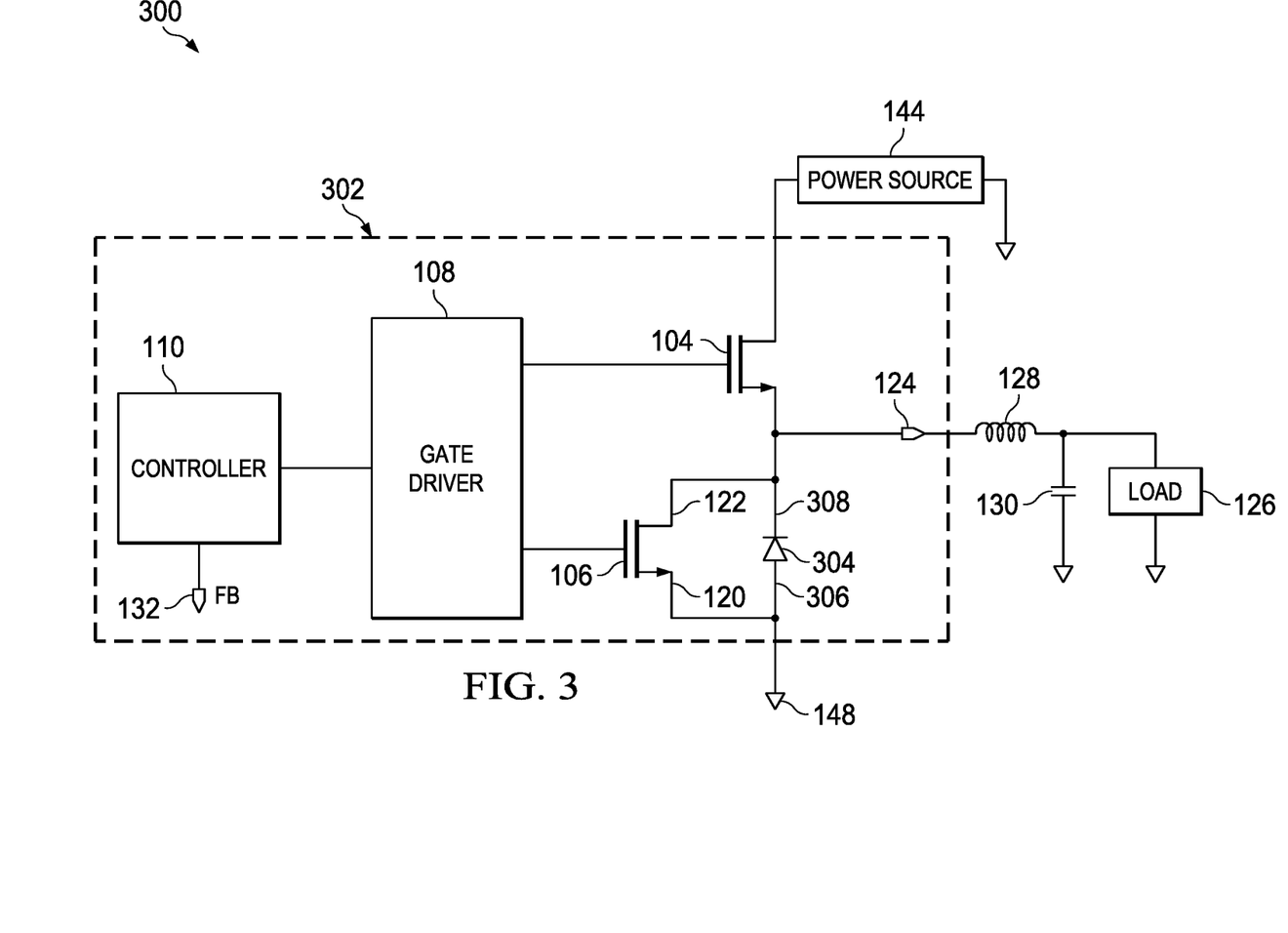
FIG. 3 shows a system comprising a DC-to-DC voltage converter in accordance with various examples.

FIG. 3 depicts an illustrative system 300 comprising a DC-to-DC voltage converter 302, with components similar to that of the DC-to-DC converter 102 in FIG. 1 sharing the same labels as in FIG. 1. Details of the gate driver 108 and the parasitic inductors 146 and 150 are not shown in FIG. 3. The DC-to-DC voltage converter 302 operates in similar fashion as the DC-to-DC voltage converter 102, but it includes a diode 304 to serve as a flyback diode. The diode 304 is coupled in parallel with the low-side FET 106. The 304 diode comprises an anode 306 coupled to the source 120 of the low-side FET 106, and comprises a cathode 308 coupled to the node 124.

During asynchronous operation, the diode 304 provides a current path from the ground 148 to the inductor 128 when the diode 304 is forward conducting. The space region within the diode 304 is charged during forward conduction, and the controller 110 switches on the low-side FET 106 to discharge the space region of the diode 304.

The descriptions of the illustrative system 100 of FIG. 1 and the illustrative timing diagram 200 of FIG. 2 are applicable to the illustrative system 300 of FIG. 3, where it is understood that the space region in the diode 304 is discharged during asynchronous operation when the low-side FET 106 is switched on for a time interval, e.g., the time intervals in FIG. 2 from t1 to t2, or from t5 to t6. Accordingly, the controller 110 is configured to switch on the low-side FET 106 for the time interval to discharge a space region in the diode 304 developed during forward conduction of the diode 304.

Figure 4:
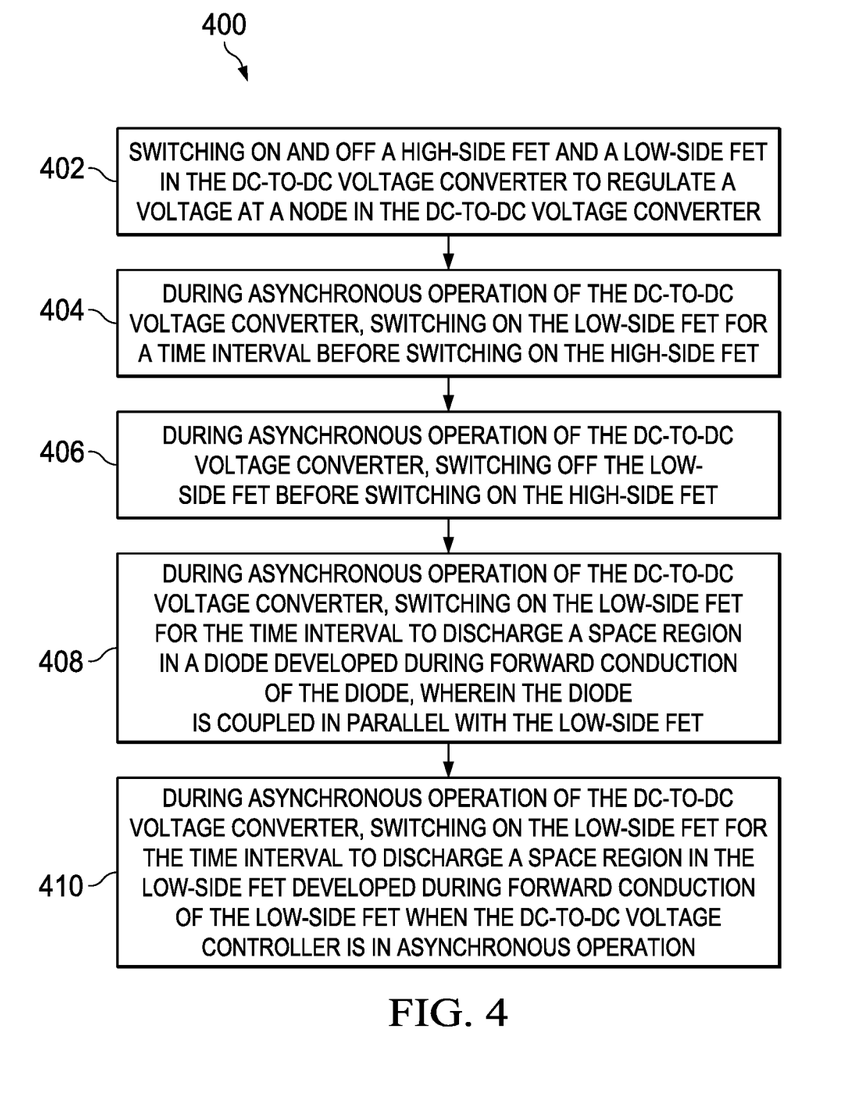
FIG. 4 shows a method in accordance with various examples.

FIG. 4 depicts an illustrative method 400 of operating the DC-to-DC voltage converter 102, where some or all of the steps in the illustrative method 400 can be performed with circuits that are hardwired, firmware controlled, software controlled, or a combination thereof. The illustrative method 400 to operate the DC-to-DC voltage converter 102 comprises: in step 402, switching on and off a high-side FET and a low-side FET in the DC-to-DC voltage converter to regulate a voltage at a node in the DC-to-DC voltage converter; in step 404, during asynchronous operation of the DC-to-DC voltage converter, switching on the low-side FET for a time interval before switching on the high-side FET; and in step 406, during asynchronous operation of the DC-to-DC voltage converter, switching off the low-side FET before switching on the high-side FET.

The illustrative method 400 further comprises, in step 408, during asynchronous operation of the DC-to-DC voltage converter, switching on the low-side FET for the time interval to discharge a space region in a diode developed during forward conduction of the diode, wherein the diode is coupled in parallel with the low-side FET. The illustrative method 400 further comprises, in step 410, during asynchronous operation of the DC-to-DC voltage converter, switching on the low-side FET for the time interval to discharge a space region in the low-side FET developed during forward conduction of the low-side FET when the DC-to-DC voltage converter is in asynchronous operation.

In the embodiments of FIG. 1 and FIG. 3, the high-side FET 104 and the low-side FET 106 are illustrated each as an n-Metal-Oxide-Semiconductor Field-Effect Transistor (nMOSFET). In some embodiments, a p-Metal-Oxide-Semiconductor Field-Effect Transistor (pMOSFET) can be used in place of a FET.

Figure 5:
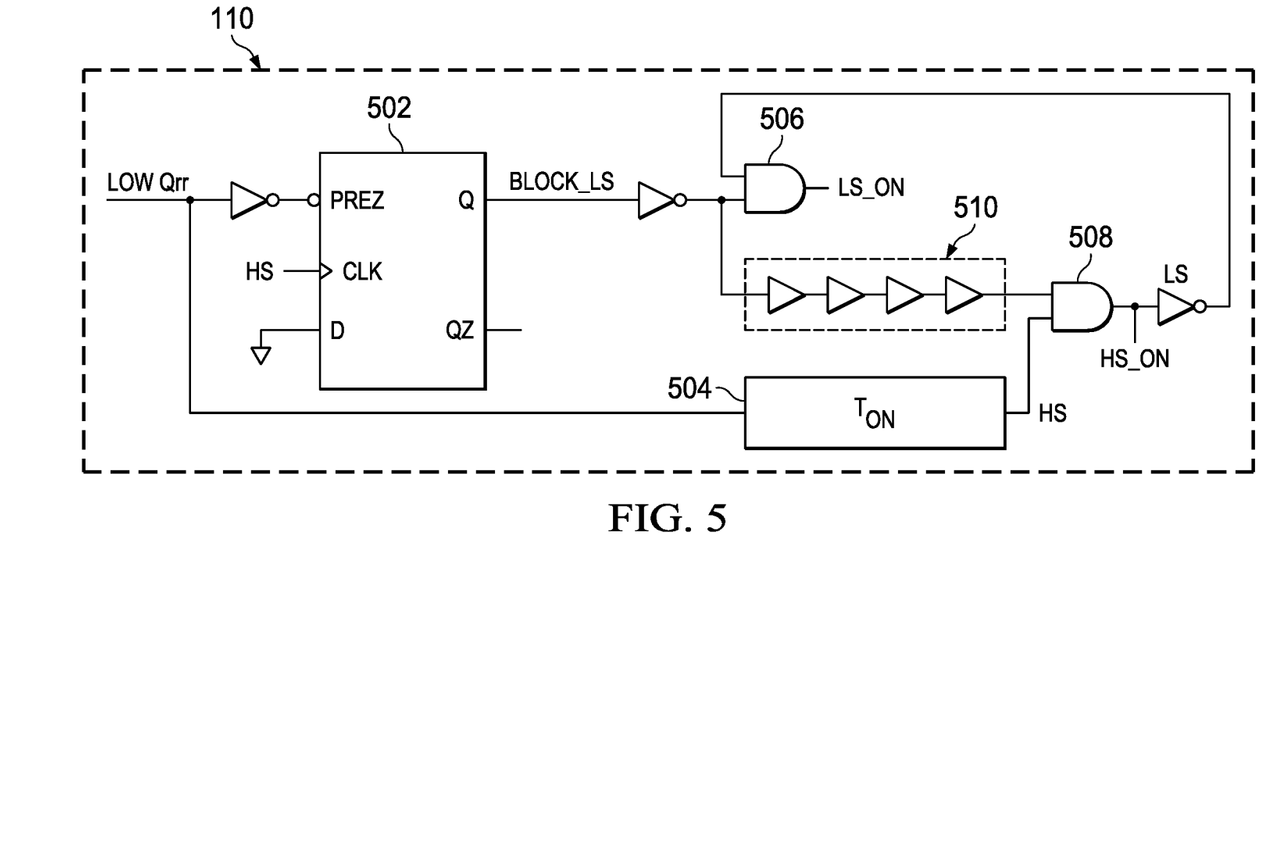
FIG. 5 shows a controller in accordance with various examples.
Figure 6:
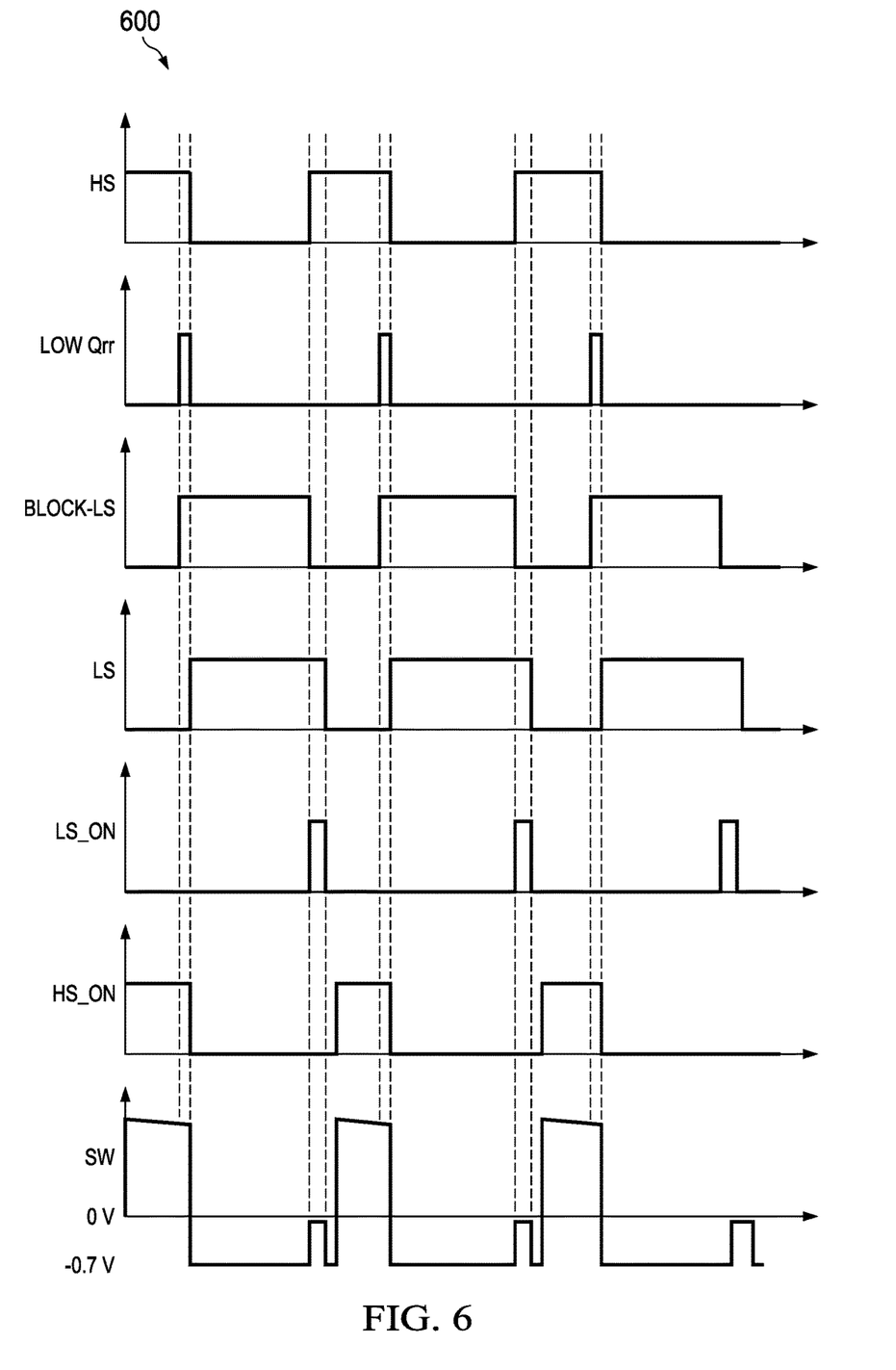
FIG. 6 shows a timing diagram in accordance with various examples.

FIG. 5 depicts the illustrative controller 110 comprising logic and circuit elements to generate the logic signals HS_ON and LS_ON when in the asynchronous mode. FIG. 5 further illustrates various logic signals used in generating the logic signals HS_ON and LS_ON, labeled Low Qrr, HS, Block_LS, and LS. Not all circuit elements in the illustrative controller 110 are shown. FIG. 6 depicts an illustrative timing diagram 600 for the logic signals HS_ON, LS_ON, Low Qrr, HS, Block_LS, and LS of FIG. 5.

The logic signal Low Qrr is asserted HIGH periodically to indicate operation in the asynchronous mode, so that the logic signal LS_ON is asserted HIGH for a time interval before HS_ON is asserted HIGH so as to discharge a space region in the low-side FET 106. The logic signal Low Qrr is provided as a preset signal a latch 502, and as an input signal to a timer 504. When the logic signal Low Qrr is asserted HIGH, the timer 504 de-asserts the logic signal HS to LOW, and the logic signal HS is again asserted HIGH at a later time specified by the timer 504, as indicated in the illustrative timing diagram 600 of FIG. 6. The logic signal HS is provided as a clock signal to the latch 502.

The output of the latch 502 is the logic signal Block_LS, illustrated in the illustrative timing diagram 600. The logic signal Block_LS, after a logical inversion, is provided as an input to an AND gate 506 and as an input to an AND gate 508 after a delay indicated by a delay element 510. The logic signal HS is provided as an input to the AND gate 508.

The output of the AND gate 508 is the logic signal HS_ON. A logical inversion of the logic signal HS_ON, denoted as the logic signal LS, is provided as an input to the AND gate 506. The output of the AND gate 506 is the logic signal LS_ON. The delay element 510 delays the output of the latch 502 so that the logic signal LS_ON is de-asserted to LOW before the logic signal HS_ON is asserted HIGH, as indicated in the illustrative timing diagram 600. In this way, the low-side FET 106 is switched off before the high-side FET 104 is switched on.

FIG. 5 provides a particular example of a circuit to generate the logic signals HS_ON and LS_ON, but many different circuit configurations can be employed to generate these logic signals.

In conventional switching, the power source 144 provides the reverse recovery charge via the high-side FET 104, resulting in lower efficiency and greater heat loss due to the power loss in both the high-side FET 104 and the low-side FET 106 (and/or the diode 304). By discharging the space charge region in the low-side FET 106 when the node 124 is close to 0V, there is relatively little power loss due to discharging the space charge region. Power efficiency is improved. Furthermore, ringing is reduced because the high-side FET 104 need not conduct extra current for a reverse recovery charge. There is no need for specially designed diodes or gate drivers.

Figure 7:
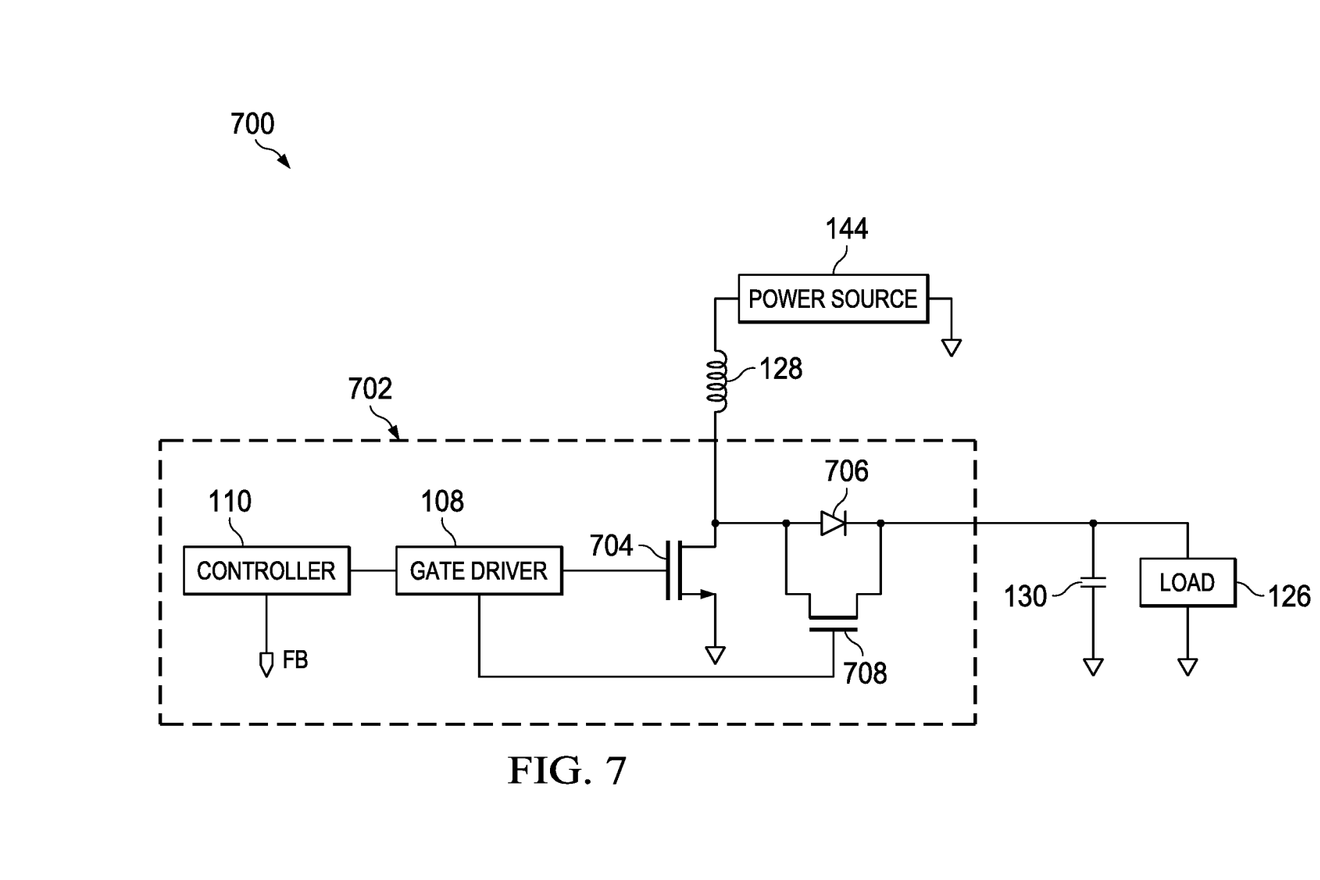
FIG. 7 shows a system comprising a DC-to-DC voltage converter in accordance with various examples.
Figure 8:
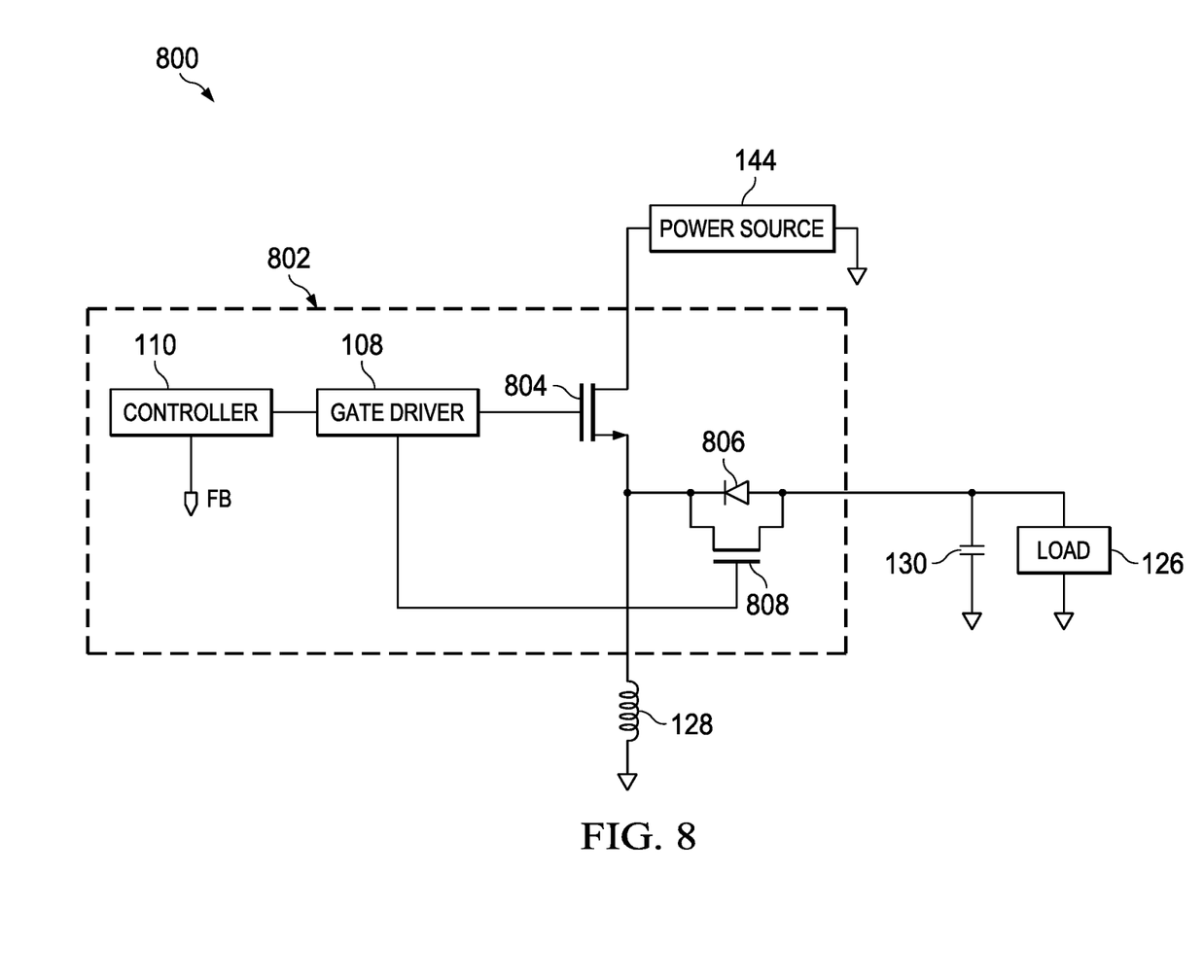
FIG. 8 shows a system comprising a DC-to-DC voltage converter in accordance with various examples.

Embodiments are also applicable to other types of DC-to-DC voltage converters where the space charge developed in a diode during asynchronous operation is discharged before energizing the inductor. FIG. 7 and FIG. 8 provide two such examples.

FIG. 7 depicts an illustrative system 700 comprising a DC-to-DC voltage converter 702. The illustrative system 700 is configured as a boost DC-to-DC voltage converter, comprising a first FET 704 to conduct current to the inductor 128 when switched on; a diode 706 coupled to the inductor 128 to conduct current to the inductor 128 when the first FET 704 is switched off; a second FET 708 coupled in parallel with the diode 706; and the controller 110 to switch on the second FET 708 for a time interval before switching on the first FET 704 and to switch off the second FET 708 before switching on the first FET 704. The load 126 is coupled to the diode 706 and the inductor 128 (by way of the diode 706 and the power source 144).

The first FET 704 conducts current from the power source 144 to the inductor 128 when switched on to energize the inductor 128 (increase the stored magnetic energy). The diode 706 provides a current path for the inductor 128 during asynchronous operation as the inductor 128 provides energy (from its decreasing magnetic field) to the load 126. The second FET 708 discharges the space charge region developed in the diode 706 when it has conducted current to the inductor 128 during asynchronous operation.

The timing diagram of FIG. 2 is applicable to the embodiment of FIG. 7, where the first FET 704 may be identified with the high-side FET 104 (HS_ON in FIG. 2) and the second FET 708 may be identified with the low-side FET 106 of FIG. 3 (LS_ON of FIG. 2). Accordingly, when describing the previous embodiments of FIG. 1 or FIG. 3, the high-side FET 104 can be referred to as a first FET, and the low-side FET 106 can be referred to as a second FET. Furthermore, in some embodiments the diode 706 may be part of the second FET 708, so that the second FET 708 includes the diode 706.

FIG. 8 depicts an illustrative system 800 comprising a DC-to-DC voltage converter 802. The illustrative system 800 is configured as a buck-boost DC-to-DC voltage converter, comprising a first FET 804 to conduct current to the inductor 128 when switched on; a diode 806 coupled to the inductor 128 to conduct current to the inductor 128 when the first FET 804 is switched off; a second FET 808 coupled in parallel with the diode 806; and the controller 110 to switch on the second FET 808 for a time interval before switching on the first FET 804 and to switch off the second FET 808 before switching on the first FET 804. The load 126 is coupled to the diode 806 and the inductor 128 (by way of the diode 806 and the power source 144).

The first FET 804 conducts current from the power source 144 to the inductor 128 when switched on to energize the inductor 128 (increase the stored magnetic energy). The diode 806 provides a current path for the inductor 128 during asynchronous operation as the inductor 128 provides energy (from its decreasing magnetic field) to the load 126. The second FET 808 discharges the space charge region developed in the diode 806 when it has conducted current to the inductor 128 during asynchronous operation.

The timing diagram of FIG. 2 is applicable to the embodiment of FIG. 8, where the first FET 804 may be identified with the high-side FET 104 (HS_ON in FIG. 2) and the second FET 808 may be identified with the low-side FET 106 of FIG. 3 (LS_ON of FIG. 2).

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A DC-to-DC voltage converter comprising:
 a first transistor having a gate, a source, and a drain;
 a node coupled to the source of the first transistor;
 a second transistor having a gate, a source, and a drain, the drain being coupled to the node, the second transistor having a space region that can store charge; and
 a controller coupled to the gate of the first transistor and the gate of the second transistor, during an asynchronous mode, the controller configured to switch on the second transistor for a time interval before switching on the first transistor to discharge the space region and to switch off the second transistor before switching on the first transistor.

2. The DC-to-DC voltage converter of claim 1, including an inductor coupled to the node.

3. The DC-to-DC voltage converter of claim 2, including a power source coupled to the drain of the first transistor.

4. The DC-to-DC voltage converter of claim 3, including a ground coupled to the source of the second transistor.

5. The DC-to-DC voltage converter of claim 1, including a power source coupled to the drain of the first transistor.

6. The DC-to-DC voltage converter of claim 5, including a ground coupled to the source of the second transistor.

7. The DC-to-DC voltage converter of claim 1, including a gate driver coupled to the gate of the first transistor and coupled to the gate of the second transistor, the controller coupled to the gate driver to switch on and off the first transistor and to switch on and off the second transistor.

8. The DC-to-DC voltage converter of claim 1, including a diode having an anode coupled to the source of the second transistor, and having a cathode coupled to the node.

9. A system comprising:
 an inductor;
 a first Field-Effect Transistor (FET) to conduct current to the inductor when switched on;
 a diode coupled to the inductor to conduct current to the inductor when the first FET is switched off, the diode having a space region that can store charge;
 a second FET coupled in parallel with the diode; and
 a controller to switch on the second FET to discharge the space region, during an asynchronous mode, for a time interval before switching on the first FET and to switch off the second FET before switching on the first FET.

10. The system of claim 9, in which the second FET includes the diode.

11. The system of claim 10, including a power source coupled to the first FET, the first FET to conduct current from the power source to the inductor when switched on.

12. The system of claim 9, including a load coupled to the diode and to the inductor.

13. A method of operating a DC-to-DC voltage converter, the method comprising:

operating the DC-to-DC voltage converter in synchronous mode including alternately cycling a high-side field effect transistor (FET) and a low side FET on without overlap;

operating the DC-to-DC voltage converter in asynchronous mode including cycling only the high-side FET on; and during asynchronous operation of the DC-to-DC voltage converter, discharging a space region coupled to the low-side FET for a time interval before turning on the high-side FET.

14. The method of claim 13, including during asynchronous operation of the DC-to-DC voltage converter, charging a space region of a diode coupled to the low-side FET during cycling the high-side FET on.

15. The method of claim 13, including during asynchronous operation of the DC-to-DC voltage converter, charging a space region of the low-side FET coupled to the high-side FET during cycling the high-side FET on.

16. The method of claim 13 including setting a value of the time interval based on a size of the space region.

* * * * *